UNITED STATES PATENT OFFICE.

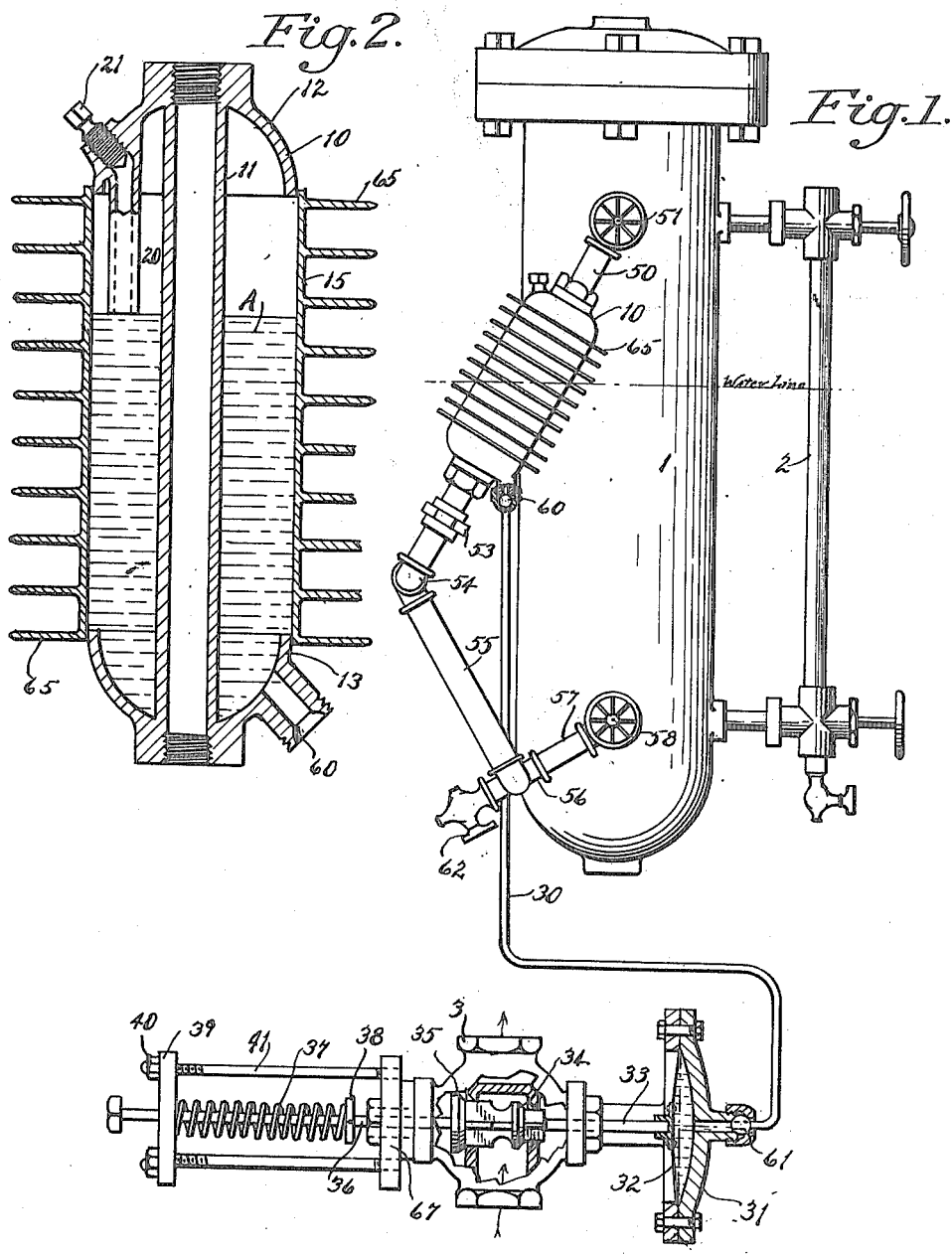

NOIBERTO G. COPLEY, OF FOSTORIA, OHIO, ASSIGNOR TO THE "S-C" REGULATOR COMPANY, OF FOSTORIA, OHIO, A CORPORATION OF OHIO.

FEED-WATER REGULATOR.

1,193,125.  Specification of Letters Patent.  Patented Aug. 1, 1916.

Application filed July 16, 1913. Serial No. 779,377.

*To all whom it may concern:*

Be it known that I, NOIBERTO G. COPLEY, a citizen of the United States, residing at Fostoria, in the county of Seneca and State of Ohio, have invented a certain new and useful Improvement in Feed-Water Regulators, of which the following is a full, clear, and exact description, reference being had to the accompanying drawings.

This invention relates to a device for automatically regulating the feeding of water to a steam boiler, so that the supply shall be varied according to the steam used and the water in the boiler maintained at a constant or corresponding level. That is to say, when the demand for steam is constant the regulator maintains the water level constant, and when the demand varies, the regulator maintains the water at whatever level is best suited for the demand at that time. In any event the regulator enables a continuous feed.

My invention is in the nature of an improvement on the present types of water level regulators, in which two conduits are used, one surrounding the other, one of the conduits having its ends in communication with the water and steam spaces of the boiler respectively, the other adapted to contain a fluid to operate a pressure device for controlling the feed of water to the boiler.

The object of the present invention is to provide a regulator which shall cause a very gradual opening and closing of the feed valve so that the feed may be continuous, under normal operating conditions; which shall be easily adjustable for any desired variation in water level; which shall be characterized by extreme simplicity and no moving parts in the regulator proper.

The invention comprises the means by which I accomplish this and other objects, as hereinafter more fully explained.

Figure 1 is a side elevation of my regulator, complete and installed on a water column, the connection from the regulator proper to the valve being somewhat diagrammatic; Fig. 2 is an axial section of the regulator proper.

Referring by numerals to the parts shown, 1 designates a usual water column in communication with the water and steam space of a boiler, not shown.

2 indicates the gage glass of such column connected with it in the usual manner.

3 indicates the valve for controlling the feed water. This valve, it will be understood, may be placed in any convenient position, the location given in the drawing being merely for purposes of illustration.

10 indicates what may be called the regulator proper. It consists of an inner tube 11 in connection with the water and steam space of the boiler, and an outer casing providing within it an annular fluid space around the tube. This outer casing is preferably made by means of two heads 12 and 13 approximately hemispherical and which may be made integral with the inner tube near its ends, and a cylindrical drum 15 surrounding and tightly engaging said heads.

20 indicates a filling tube for the casing, which extends from the head 12 and is closed by a screw plug 21 in that head.

60 indicates a nipple extending from the head 13 for the attachment of the pressure pipe.

The pressure pipe 30 is secured at one end to the nipple 60 and its other end communicates with the space between a casing 31 and a diaphragm 32, which operates the valve controlling the feed water. This valve may be of any suitable construction. I have shown a very satisfactory valve for this purpose which is also my invention, and will form the subject matter of a separate application. I will now briefly describe this valve as shown in the drawings. Suitable valve heads 34 and 35 operate in conjunction with the seats in the casing 3, and are operatively connected by a rod 33 with the diaphragm 32. 37 indicates a spring surrounding the valve stem 36 and bearing against a collar 38 thereon. This valve stem 36 is rigid with the heads, and the action of the spring 37 tends to seat the valve heads. 39 designates a yoke bar bearing against the spring and compressing it, being adjustable by means of nuts 40 on stationary rods 41 which extend from the valve casing through the yoke bar.

Water is contained in the space between the diaphragm and the casing 31 within the tube 30 and within the casing of the regulator up to the lower end of the filling tube 20. The normal level for water in the boiler is slightly lower than the bottom of the filling tube 20. A is the casing around the tube 11. Now, if the water level in the boiler drops, the increasing amount of steam within the tube 11 heats and vaporizes some of the water A, increasing the pressure within the casing, which acts on the diaphragm 32 to open the feed valves 34, 35 more widely, allowing more water to enter the boiler. Conversely, if the water level within the tube 11 rises, the pressure in the casing drops and the spring 37 moves the valves 34, 35 in the closing direction, diminishing the water fed. Accordingly, the water is fed continuously but in varying quantities, according to the way the demand for steam varies the level of the water in the boiler.

To regulate the sensitiveness of variation, I mount my regulator proper in an adjustable manner so that it may be placed in various inclinations. The more nearly upright this regulator is the larger the variation in level is required to effect a given variation in the opening of the feed valve; the more nearly horizontal the regulator, the more sensitive the regulation of the valve. By suitably positioning the inclination of the regulator, therefore, I can provide a proper feed for various actions in the boiler; that is, whether the boiler be a quiet one, capable of having an accurate feed water level, or a surging boiler, where the level varies widely.

To provide for conveniently changing the inclination of the regulator proper without disconnecting it, I may connect it with the boiler or water column in the manner shown in the drawing. There the upper end of the tube 11 is connected with a pipe 50 which forms an L from a pipe extending horizontally from the water column and carrying the ordinary shut-off valve 51. The lower end of the tube 11 is connected by a pipe and a union 53 with an elbow 54, which screws or is swiveled in an elbow on the pipe 55. This pipe has an elbow connecting with a T 56 in the pipe 57, which screws into a T connected at the lower point of the water column, and carrying the usual shut-off valve 58. The pipe 57 is shown as provided with a drain cock 62.

By moving the elbow 54 toward or from the water column, the regulator proper is swung on the upper pipe, on the axis of the valve 51 as a center, the lower pipe 57 swinging about the axis of the valve 58 and pipe 55 turning about its elbow connection with the pipe 57. The pipe 30 is long enough and small enough so that it may be easily bent to accommodate this changing of the position of the regulator. The pipe shown is connected with the regulator and with the casing 31 by ball-and-socket unions 60 and 61 to provide for such movement.

To keep the regulator properly cool, when necessary I prefer to provide the casing 15 with annular lips or wings 65 which radiate the heat from the casing.

My device is simple and cheap in construction; it is easily applied and adjusted to position and re-positioned as desired; there is nothing about it to get out of order, and it is very effective in regulating the flow of the feed water according to the requirements of the boiler.

Having thus described my invention, what I claim is:

1. The combination of a tube adapted to be held at varying inclinations and connected at its upper end with the steam space of a boiler and at its lower end with the water space, means whereby the angle at which said tube stands may be varied, a casing surrounding the tube between its ends, a valve for controlling the feed water, means for operating the valve, and conduit for conveying pressure from the casing to the valve operating means.

2. The combination of a device comprising two conduits one surrounding the other, means for holding said device at varying inclinations, means connecting one of the conduits at one end with the steam space and at the other end with the water space of a boiler, a pressure device for controlling the feed of water to the boiler, and a pressure transmitting medium within the other conduit acting on said pressure device.

3. The combination of a tube pivotally connected at one end and adjustably connected at the other end to a boiler, whereby the angle at which said tube stands may be varied, one end of said tube being connected with the steam space and the other with the water space of said boiler, a casing surrounding the tube uncommunicatingly and adapted to contain fluid, and means whereby a change in pressure of the fluid due to a change in temperature in the tube may operate to regulate the supply of feed water to the boiler.

4. A feed water regulator comprising a valve, a pressure actuated mechanism for controlling the valve, a tube pivotally connected at one end and adjustably connected at the other end to a boiler, whereby the inclination of the tube may be varied, a casing surrounding the tube intermediate its ends, being located substantially at the water line of the boiler, one end of said tube being connected to the steam space and the other end to the water space of the boiler, and a connection whereby a change of pressure within the casing may be transmitted to the pressure actuated mechanism.

5. In a feedwater regulator, the combination with a valve and a pressure actuated mechanism for operating the valve, of an adjustable thermo-dynamic regulator comprising a tube having one end pivotally mounted on a boiler and having its other end adjustably mounted, whereby the tube may be oscillated about its pivoted end, one of said connections to the boiler being in communication with the steam space and the other with the water space, said tube having a pair of heads near its respective ends, a drum connecting one head with the other and providing an annular space about the tube, and a connection whereby a change in pressure in said annular space may be transmitted to the pressure actuated mechanism, thereby operating the valve.

In testimony whereof, I hereunto affix my signature in the presence of two witnesses.

NOIBERTO G. COPLEY.

Witnesses:
ALBERT H. BATES,
JUSTIN W. MACKLIN.